United States Patent [19]

McCall

[11] Patent Number: 4,823,884

[45] Date of Patent: Apr. 25, 1989

[54] PLOW CLEANING DEVICE

[76] Inventor: Keith H. McCall, Rt. 2, Box 83, St. Francis, Kans. 67756

[21] Appl. No.: 111,916

[22] Filed: Oct. 21, 1987

[51] Int. Cl.$^4$ .......................... A01B 3/24; A01B 71/08
[52] U.S. Cl. .................................. 172/508; 172/606; 172/719; 172/720; 172/747
[58] Field of Search ............... 172/196, 508, 517, 606, 172/607, 699, 719, 720, 747, 772; 206/349, 822; 428/583

[56] References Cited

U.S. PATENT DOCUMENTS

| | | | |
|---|---|---|---|
| 2,361,596 | 10/1944 | Broschinski | 172/508 |
| 2,913,060 | 11/1959 | Owen et al. | 172/747 |
| 3,126,969 | 3/1964 | Sewell | 172/747 X |
| 4,206,818 | 6/1980 | Beckham et al. | 172/747 X |
| 4,321,970 | 3/1982 | Thigpen | 172/699 X |
| 4,671,363 | 6/1987 | Bolinger | 172/760 X |

FOREIGN PATENT DOCUMENTS 2093325 9/1982 United Kingdom .............. 172/699

OTHER PUBLICATIONS

Krause Plow Corporation, 3700 Series "Flex-Wing", Sweep Plow Brochure, Hutchinson, KS 67504.
Sunflower Manufacturing Co., Inc., Series 3000 Blade Plows, 4/87, Beloit, KS 67420.

Primary Examiner—Richard T. Stouffer
Attorney, Agent, or Firm—Fields, Lewis, Pittenger & Rost

[57] ABSTRACT

The problem of having dirt and debris stick to the shank of a subsoil plow is solved by providing a non-stick cover body that attaches to a lower portion of the shank and is sized and configured and of a material to which dirt and debris will not adhere. Fasteners in the form of staples insert into holes in laterally spaced tail edge portions is provided. The body is made of a sheet of ultra high molecular weight-polyethylene that is sized, and then bent around a mandril, heated, then cooled and machined as required to be generally complementary with the shape of the lower portion of the shank to which the body is fastened.

20 Claims, 1 Drawing Sheet

U.S. Patent    Apr. 25, 1989    4,823,884
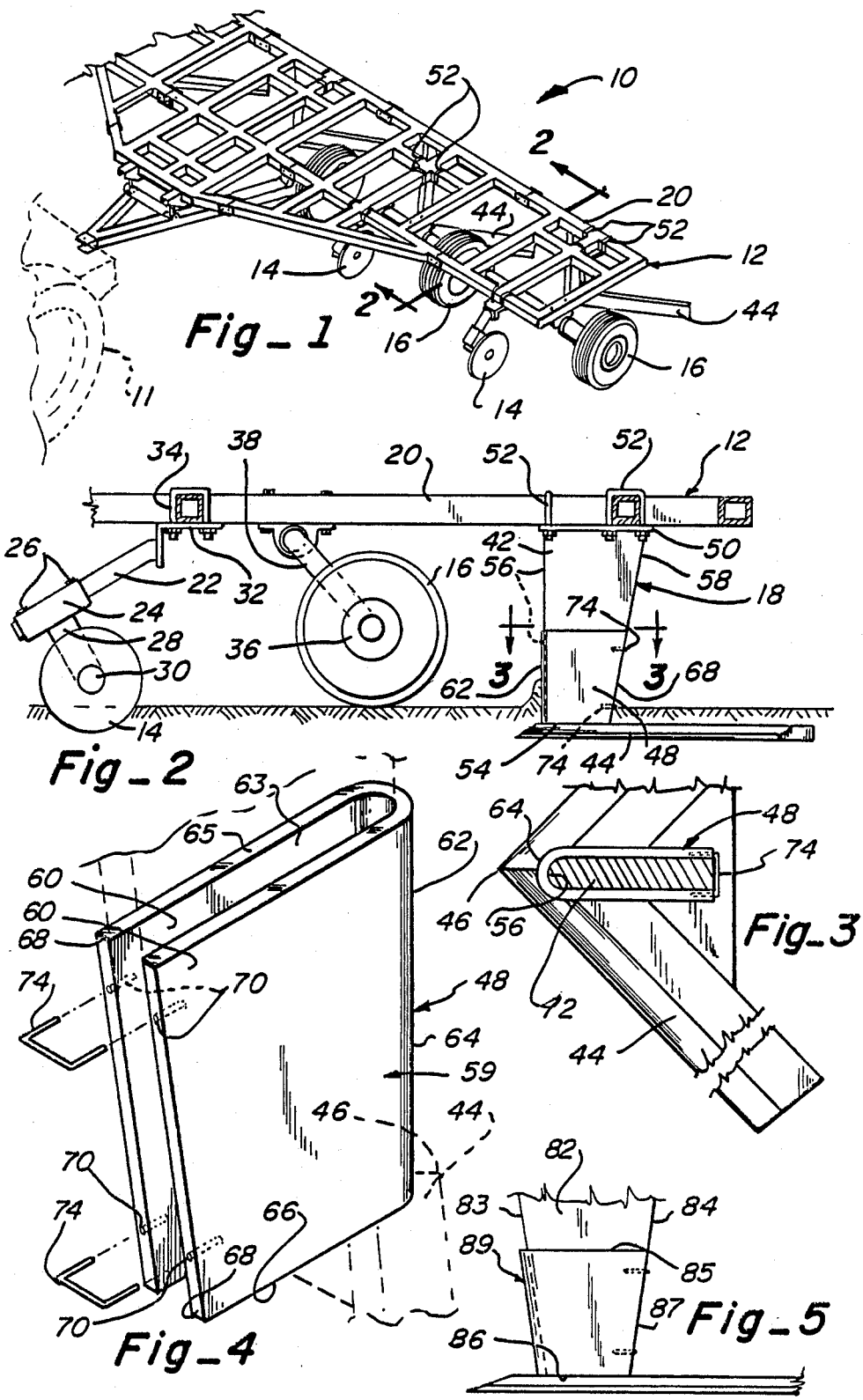

PLOW CLEANING DEVICE

TECHNICAL FIELD

This invention relates generally to subsoil plows and, more particularly, to a cleaning device for preventing the build up of dirt and debris on the shank of a subsoil plow and the like.

BACKGROUND OF THE INVENTION

Subsoil plows are referred to by those in the trade as blade plows, sweep plows and sometimes as stubble mulch plows. The same basic function of these plows is to break up or loosen the subsoil without significantly disturbing the soil's surface so that fertilizers and weed control substances can be introduced into the subsoil. By disturbing the soil's surface as little as possible, erosion and soil water losses due to evaporation can be minimized.

A conventional subsoil plow has a V-shaped plow blade which is sometimes referred to as a frog. The plow blade is typically mounted to and suspended from a shank sometimes referred to as a standard. The shank, in turn, is suspended from and secured to a wheeled support frame which, in turn, is hitched to and pulled by a tractor or like powered vehicle. A subsoil plow is also typically used in conjunction with a large coulter blade which is also suspended from the support frame. The coulter blade is aligned with and located in front of the blade's point which is the point in the V of the V-shaped blade. The coulter blade serves to loosen soil for the subsoil plow's shank so that the plow can be pulled easier through the soil, i.e. with less resistance.

When plowing with a conventional subsoil plow, the V-shaped blade is located below the soil's surface to loosen the soil so that, as previously mentioned, fertilizer and weed control substances can be introduced into the soil. The V-shaped blade is generally located a selected distance below the soil surface and generally is oriented with respect to the soil surface so that a geometric plane passing through the blade's V-shape is essentially parallel to the soil's surface. The shank has a top end and bottom end. The bottom end is attached to the V-shaped blade at a point behind the blade's point. The shank extends generally upwardly from the blade in an upright or generally vertical position for approximately two and one half feet and is secured to the support frame at its top end.

While subsoil plows have been in existence for many years, efforts are continually being made to improve their performance, reliability and reduce fuel consumption of the vehicles employed to pull the plows.

The Sunflower Manufacturing Company, Inc. of Beloit, Kan. notes in its Series D 3000 Flex-King blade plows brochure that its plow's standard or shank narrows to a streamlined, slim shape wherever soil is to be contacted to keep soil disturbance at a minimum. The slim shape of the shank also makes it easier for a tractor to pull the plow.

The Krause Plow Corp. of Hutchinson, Kans., recently pointed out in its 3700 series "Flex-Wing" sweep plow brochure, Form No. 3700SP, that tractor fuel consumption can be reduced by preventing dirt from building up on the bottom portion of the shank which is located against the plow's blade. Krause notes that dirt build up in this area increases fuel consumption since it increases draft or friction between the shank and the soil during plowing. Krause states that dirt build up in this area can be eliminated by mounting the plow's shank to the blade at a location very close to the blade point. Krause states that an ordinary plow allows dirt to build up in this area since the shank is mounted too far back on the blade which creates a space between the blade point and the shank which collects dirt, particularly moist dirt.

While mounting of the shank at a location close to the blade point undoubtedly minimizes dirt build up in this area as noted by Krause, it would be desirable to completely eliminate dirt build up in this area. It would also be desirable if it were somehow possible to retrofit existing conventional subsoil plows to eliminate or at least minimize the build up of dirt in this area of the plow's shank.

DISCLOSURE OF INVENTION

A cleaning device that readily attached to a lower portion of a shank of a plow is made of a smooth rigid body that covers the shank and is downwardly tapered at rear tail edge portions to be flush with the rear of the shank. The device disclosed is a unitary cover body made of non-stick, abrasion-resistant, ultra high molecular weight polyethylene. The cover body is advantageously fastened at the rear by one or more staples that insert into holes in laterally spaced tail edge portions.

BRIEF DESCRIPTION OF THE DRAWINGS

The details of this invention will be described in connection with the accompanying drawings, in which:

FIG. 1 is a top perspective view of subsoil plow apparatus on which the cleaning device of the present invention is mounted;

FIG. 2 is a sectional view taken along lines 2—2 of FIG. 1;

FIG. 3 is a sectional view taken along lines 3—3 of FIG. 2;

FIG. 4 is a rear perspective view of the cleaning device;

FIG. 5 is a side elevational view of another form of plow shank with a modified cleaning device mounted thereon.

DETAILED DESCRIPTION

Referring now to the drawings in FIG. 1, there is shown a farm implement which includes a frame apparatus 10 adapted to be pulled by a tractor 11 or like powered vehicle. Apparatus 10 contains five sections 12 for subsoil plowing. Each section 12 as is further illustrated in FIG. 2 generally includes a rolling coulter 14, a wheel 16 and a subsoil plow 18, all of which are mounted to a support frame 20. Each coulter 14 is mounted to support frame 20 by a mounting assembly which includes an inner tubular member 22, an outer tubular member 24 having adjusting bolts 26, a bracket 28, an axle means 30, an angled bracket 32 and a U-bolt assembly 34.

Coulter 14 is mounted on axle means 30 for rotatable movement thereon. Axle means 30 is, in turn, mounted to bracket 28 which is welded to the side of outer tubular member 24. Outer tubular member 24 is in telescoping engagement with inner tubular member 22 and rigidly secured thereto by tightening adjusting bolts 26. Inner tubular member 22 is, in turn, welded to angled bracket 32 which is bolted to the support frame by U-bolt assembly 34.

Wheel 16 is mounted to support frame 20 by an adjustable mounting assembly which can be adjusted to set and control the support frame's height above the soil surface which, in turn, controls the depth at which subsoil plow 18 plows beneath the soil's surface and the depth to which coulter 14 slices the soil. The adjustable mounting assembly forms no part of the present invention and, accordingly, will not be described except to the extent that tire 16 is mounted on a hub 36 which is secured to a rocker shaft 38 which, in turn, is mounted to support frame 20.

The subsoil plow 18 shown includes a shank or standard 42 and a frog or V-shaped plow blade 44 having a blade point 46. Shank 42 has a flanged top end 50 which is secured to support frame 20 by three U-bolts 52, two of which are illustrated in FIG. 2. Shank 42 also has a bottom end 54 which is welded to V-shaped blade 44 at a location just behind blade point 46. Shank 42 also has a rounded front edge 56 which faces forward or in the plow's direction of travel and a generally flat downwardly tapered back edge 58 which faces, downstream, or away from the direction of travel of the plow. The front edge 56 of the shank 42 is vertical and is of the type discussed in the above mentioned Sunflower brochure (Flex-King).

The cleaning device of the present invention is generally designated by numeral 48 and is shown in FIG. 2 as mounted on the lower portion of the plow shank 42. The cleaning device 48 shown includes a generally U-shaped self-cleaning one-piece cover body 59 having a rounded front portion 62 and two spaced side wall portions 60 extending rearwardly from opposite sides of the forward portion to form an interior channel 63 that is open at the top and bottom and at the rear. The channel 63 formed in the body 59 is sized and shaped to be generally complementary with that of a lower portion of the shank 42 on which it is mounted. The body 59 is hard, rigid, and has a smooth, non-stick exterior surface. Body 59 has a front edge 64, top edge 65, bottom edge 66 and a back or tail edge 68. The top and bottom edges are perpendicular to the front edge while the tail edge tapers from top to bottom.

The front edge 64 is defined by the end of the rounded contour and causes the soil to part and move along the side wall portions with a minimum of resistance. The top edge 65 and bottom edge 66 are provided by the upper and lower extremities of the front and sidewall portions and the trailing edge 68 of the two side wall portions form a pair of laterally spaced tail edge portions.

Each of the tail edge portions is provided with an upper set of holes 70 a selected distance from the top edge 65 and a lower set of holes 70 a selected distance from the bottom edge 66. For the embodiment shown on the Flex-King type shank 42 a preferred height of body 59 is eight inches and the upper set of holes are $2\frac{1}{4}$ inches from the top edge 65 and the lower set of holes are $2\frac{1}{4}$ inches from the bottom edge 66.

The body 59 is installed over a lower portion of shank 42 and its side wall portions 60 are sized and cut on a bevel so that tail edge portions are flush with the back edge 58 of the shank. This flush mounting enables a pair of staples 74 to be inserted into the pairs of holes 70 to rigidly secure the device to the shank (as depicted in FIG. 2) and prevent the body from riding or sliding up on the shank during plowing. Such upward sliding movement of the body is prevented since the shank is tapered, as previously mentioned, as it extends downwardly from its top end to its bottom end. The tapered shape and staples has the staples acting as a wall against upward movement of the body along the back edge 58 of the shank. Body 59 will not move upwardly along the shank as long as staples 74 remain in place in the holes 70.

Referring now to FIG. 5 there is shown another form of plow shank 82 having a forward edge 83 that tapers from top to bottom as well as a rear edge 84 that tapers from top to bottom. The cleaning device 89 shown attached thereto is modified to the extent the top edge 85 and bottom edge 86 are at a slight angle to being perpendicular to the front edge so they are horizontal in use. This shank is shown in the Krause brochure above discussed. This cleaning device 89 then has the top edge 85, bottom edge 86 and tail edge 87 machined or cut after the sheet is shaped. A preferred height dimension for device 89 is 10 inches.

It is understood that the body 59 could also be more in the nature of a surface for lower portion of the shank and could be bonded (chemically, thermally or otherwise) directly to a lower portion within the spirit of the present invention.

The body 59 has a pre-determined height as above designated because dirt tends to build up in an area on a lower portion of the shank. When the body is installed over this area, in accordance with the present invention, dirt and debris build up is effectively prevented. The cover prevents dirt build up since it is made from a smooth, hard non-stick, abrasion resistant material which has little or no affinity for dirt, even moist dirt.

A non-stick, abrasion resistant material which has been found to prevent dirt and debris build up on the bottom portion of a conventional subsoil plow shank is a recycled ultra high molecular weight-polyethylene which is sold in sheets by the Solidur Plastics Company of Pittsburgh, Pa. The catalog identification is SOLIDUR 25 Reclaim and has the following mechanical properties:

| Property | ASTM Test | Sheet |
|---|---|---|
| Density | D729 | .94 gm/cm |
| Tensile Strength @ Yield | D638 | 3400 psi |
| Tensile Strength @ Break | D638 | 4900 psi |
| Elongation @ Break | D638 | 321% |
| Compressive Deformation 1200 PSI, 50 degrees C. 24 hr. | D621 | 8–10% |
| Izod Impact Strength | D256(1) | 18 ft-lb/in |
| Hardness Shore "D" | D2240 | 68 |
| Abrasion Resistance | * | 90 |
| Water Absorption | D570 | Nil |
| Flexural Modulus 1% secant | D790B | 152 psi $\times$ $10^3$ |
| Dynamic Coefficient of Friction | | .15–.18 ratio of tension to load |

*Sand slurry abrasion (relative volumetric abrasion SOLIDUR = 100); 2 parts water/3 parts sand; 1" $\times$ 3" $\times$ $\frac{1}{4}$" specimen; rotational speed = 1200 rpm; test period = 24 hours.

The body 59 above described can be made by the following method. A flat sheet of suitable non-stick material preferably $\frac{1}{4}$ inches in thickness is first cut from a large flat sheet of the material. The cut sheet should be cut so as to have dimensions which approximate the final dimensions of the cover body. The cut sheet is then formed or bent about a mandril having a shape which is similar, preferably identical, to that of the shank upon which the body is to be mounted. The sheet is then clamped to the mandril and then heated to a temperature of about 400 degrees Fahrenheit for between about 30 to 45 minutes so it will be capable of retaining its bent shape when it is cooled. After heating, the sheet and mandrel are cooled for about 30 minutes in room temperature air. The cooled preform is then further cooled in a bath of water at ambient temperature for about 30 minutes. The now cooled, bent body is removed from the mandril and machined, if necessary, so that its tailing edge portions will be flush with the back edge of the shank upon which it is to be mounted. Holes 70 are then drilled into the tail edge portions and the finished cover is positioned on the bottom portion of the shank it is designed to cover. Staples 74 are then inserted into holes 70 to hold the cover firmly in place. There is no need to bolt the cover directly to the shank since, as previously mentioned, the shank's tapered shape will prevent the cover from sliding up on the shank during plowing.

Based on the foregoing description, it should be appreciated that the present invention not only provides a device for new subsoil plows, but also a device which can be easily installed by a farmer to retrofit his or her existing subsoil plows and readily removed and replaced as required.

Although the present invention has been described with a certain degree of particularity, it is understood that the present disclosure has been made by way of example and that changes in details of structure may be made without departing from the spirit thereof.

What is claimed is:

1. A cleaning device for attachment to a shank supporting a subsoil plow comprising:
   a body means of a non-stick, abrasion-resistant material consisting essentially of a vertical, U-shaped channel having a rounded forward portion facing towards the plow's direction of travel and two generally parallel, spaced side walls extending rearwardly from opposite sides of said forward portion and terminating at laterally spaced tail edge portions facing away from said plow's direction of travel, said tail edge portions including upper and lower sets of holes along rear edges thereof, each of said rear edges from a top edge to a bottom edge being forwardly tapered relative to the plow's direction of travel and facing away from said direction of travel; and
   fastening means for rigidly attaching said body means to a plow shank comprising U-shaped staples insertable into said sets of holes thereby extending across said channel from one to the other of said tail edge portions.

2. A cleaning device as set forth in claim 1 wherein said body means is made of a material having a density of about 0.94 gm/cm, a shore "D"[ hardness of about 68, abrasion resistance of about 90 when measure by the Sand slurry abrasion process (relative volumetric abrasion SOLIDUR=100); 2 parts said; parts water/3 parts sand; 1"×3"×¼" specimen; rotational speed=1200 rpm; test period=24 hours, and a dynamic coefficient of friction of about 0.15 to 0.18 ratio of tension to load.

3. A cleaning device as set forth in claim 1 wherein said body means is made of ultra high molecular weight-polyethylene.

4. A cleaning device as set forth in claim 1 wherein said fastening means comprises two of said U-shaped staples.

5. A cleaning device as set forth in claim 1 wherein a front edge of said forward portion from a top edge to a bottom edge is rearwardly tapered relative to the plow's direction of travel.

6. A cleaning device as set forth in claim 5 wherein said body means is made of a material having a density of about 0.94 gm/cm, a shore "D" hardness of about 68, abrasion resistance of about 90 when measure by the Sand slurry abrasion process (relative volumetric abrasion SOLIDUR=100); 2 parts said; parts water/3 parts sand; 1"×3"×¼" specimen; rotational speed=1200 rpm; test period=24 hours, and a dynamic coefficient of friction of about 0.15 to 0.18 ratio of tension to load.

7. A cleaning device as set forth in claim 5 wherein said body means is made of ultra high molecular weight-polyethylene.

8. A cleaning device as set forth in claim 5 wherein said fastening means comprises two of said U-shaped staples.

9. In a plow for plowing subsoil, the combination comprising:
   a plow blade for breaking up the subsoil;
   a shank having a bottom end rigidly attached to said plow blade and a top end connected to a support frame which, in turn, is connectable to a vehicle for pulling said plow, a rear edge of said shank from said top end to said bottom end being forwardly tapered relative to the plow's direction of travel;
   a cleaning device of a non-stick, abrasion-resistant material in the form of a cover body secured to a lower portion of said shank, said cover body consisting essentially of a vertical, U-shaped channel member having a rounded forward portion facing towards the plow's direction of travel and two generally parallel, spaced side walls extending rearwardly from opposite side of said forward portion and terminating at laterally spaced tail edge portions facing away from said plow's direction of travel, said tail edge portions from their top edges to their bottom edges being forwardly tapered relative to the plow's direction of travel and being generally complementary with the taper along said rear edge at said lower portion of said shank so that said tail edge portions are flush with said rear edge; and
   fastening means for rigidly securing said cleaning device to said lower portion of said shank.

10. In a plow as set forth in claim 9 wherein said cleaning device is made from a single unitary sheet of said non-stick, abrasion-resistant material having a smooth, hard exterior surface capable of preventing dirt and debris from building up thereon during plowing and reducing friction between said plow and the soil which is generated during plowing.

11. In a plow as set forth in claim 9 wherein said cleaning device is made of ultra high molecular weight-polyethylene.

12. In a plow as set forth in claim 9 wherein said tail edge portions include upper and lower sets of holes and said fastening means comprises vertically spaced, U-shaped staples inserted into said sets of holes and extending across said rear edge of said shank.

13. In a plow as set forth in claim 12 wherein said cleaning device is made of ultra high molecular weight-polyethylene.

14. In a plow as set forth in claim 12 wherein said fastening means comprises two U-shaped staples.

15. In a plow for plowing subsoil, the combination comprising:
  a plow blade for breaking up the subsoil;
  a shank having a bottom end rigidly attached to said plow blade and a top end connected to a support frame which, in turn, is connectable to a vehicle for pulling said plow, front and rear edges of said shank from said top end to said bottom end being rearwardly and forwardly tapered, respectively, relative to the plow's direction of travel;
  a cleaning device of a non-stick, abrasion-resistant material in the form of a cover body secured to a lower portion of said shank, said cover body consisting essentially of a vertical, U-shaped channel member having a rounded forward portion facing towards the plow's direction of travel and two generally parallel, spaced side walls extending rearwardly from opposite sides of said forward portion and terminating at laterally spaced tail edge portions facing away from said plow's direction of travel, said forward portion from a top edge to a bottom edge being rearwardly tapered relative to the plow's direction of travel and being generally complementary with the taper along a front edge of a lower portion of said shank, and said tail edge portions from their top edges to their bottom edges being forwardly tapered relative to the plow's direction of travel and being generally complementary with the taper along said rear edge at said lower portion of said shank so that said tail edge portions are flush with said rear edge; and
  fastening means for rigidly securing said cleaning device to said lower portion of said shank.

16. In a plow as set forth in claim 15 wherein said cleaning device is made from a single unitary sheet of said non-stick, abrasion-resistant material having a smooth, hard exterior surface capable of preventing dirt and debris from building up thereon during plowing and reducing friction between said plow and the soil which is generated during plowing.

17. In a plow as set forth in claim 15 wherein said cleaning device is made of ultra high molecular weight-polyethylene.

18. In a plow as set forth in claim 15 wherein said tail edge portions include upper and lower sets of holes and said fastening means comprises vertically spaced, U-shaped staples inserted into said sets of holes and extending across said rear edge of said shank.

19. In a plow as set forth in claim 18, wherein said cleaning device is made of ultra high molecular weight-polyethylene.

20. In a plow as set forth in claim 18 wherein said fastening means comprises two U-shaped staples.

* * * * *